J. T. SIMPSON.
FLYING MACHINE.
APPLICATION FILED JULY 12, 1910.

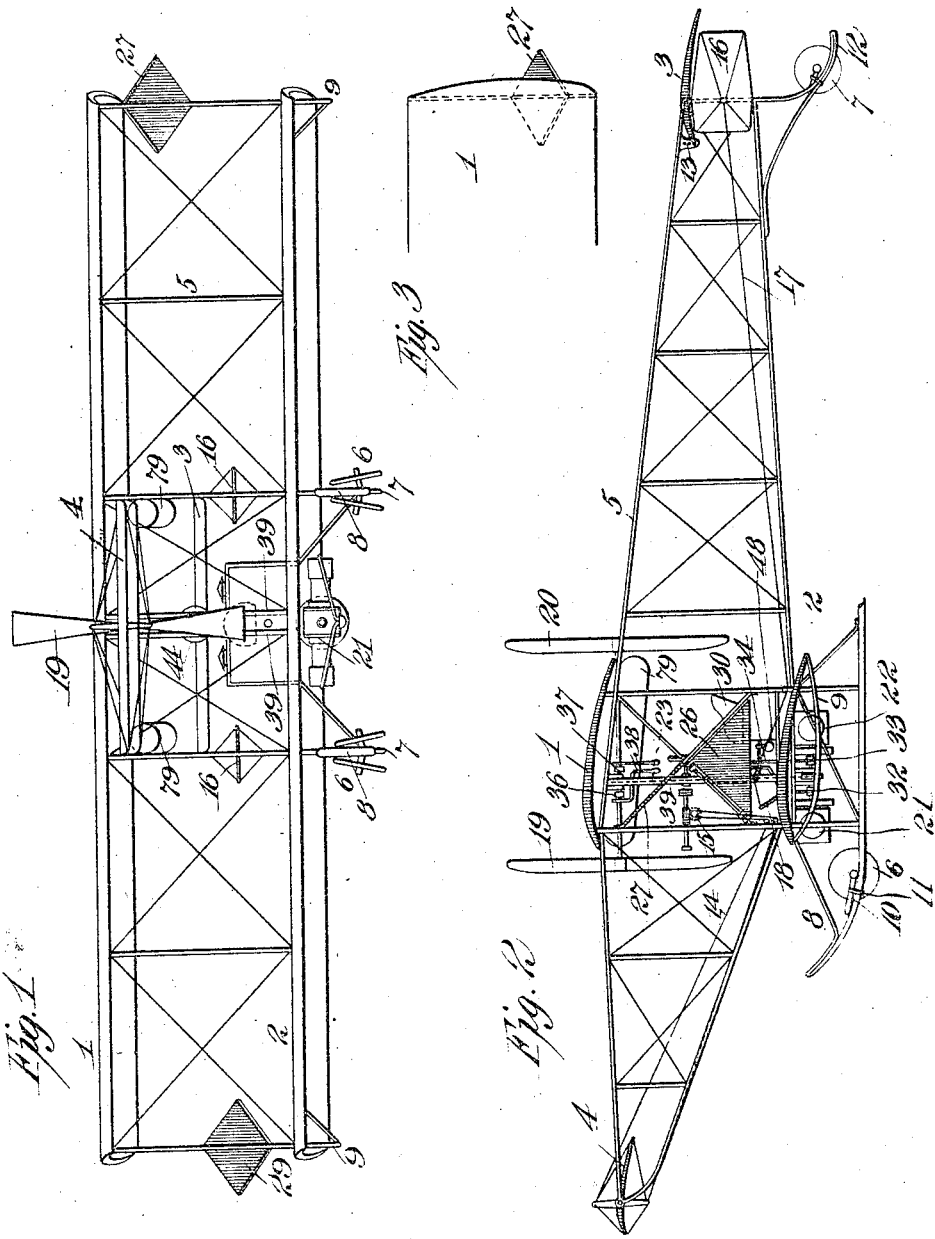

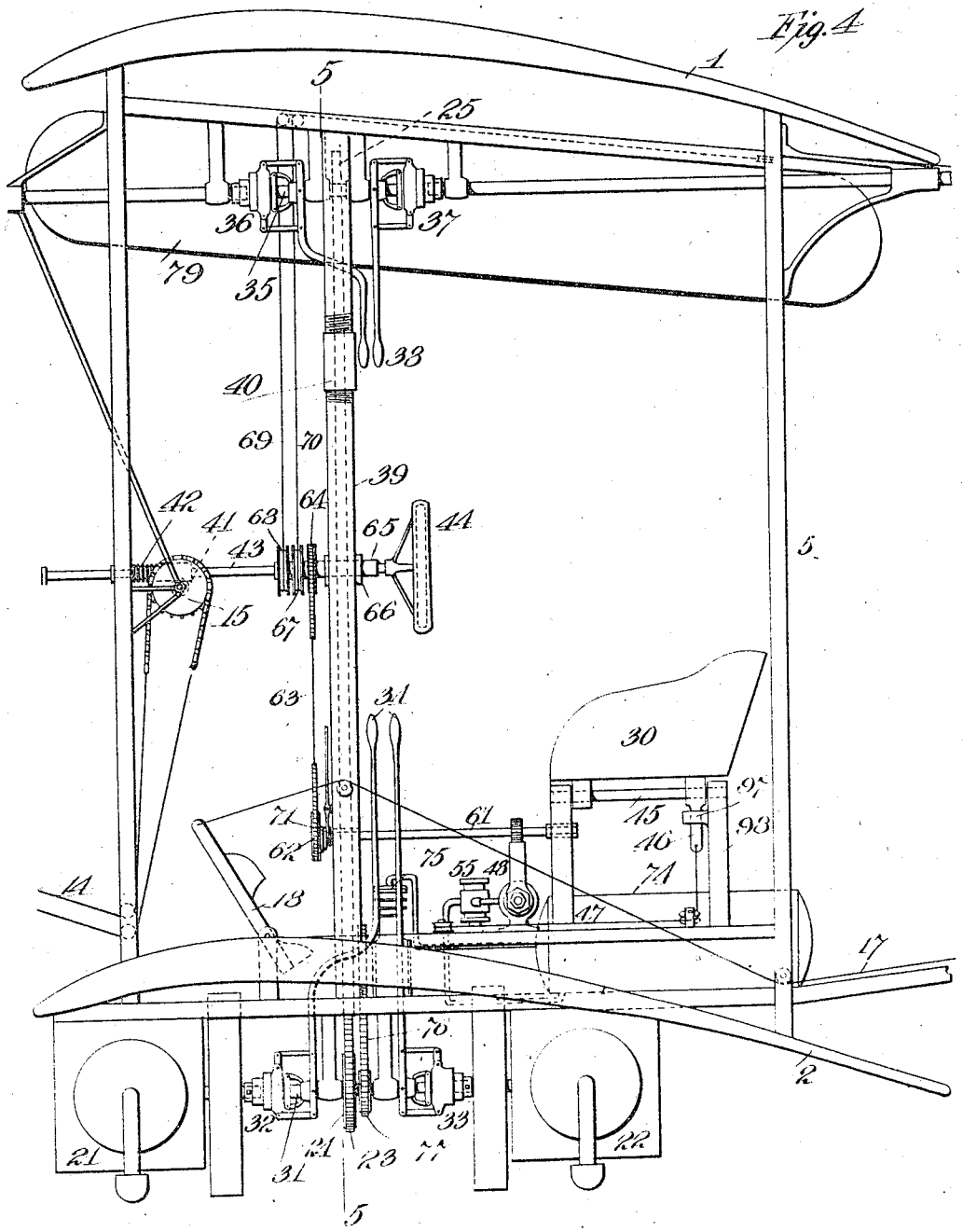

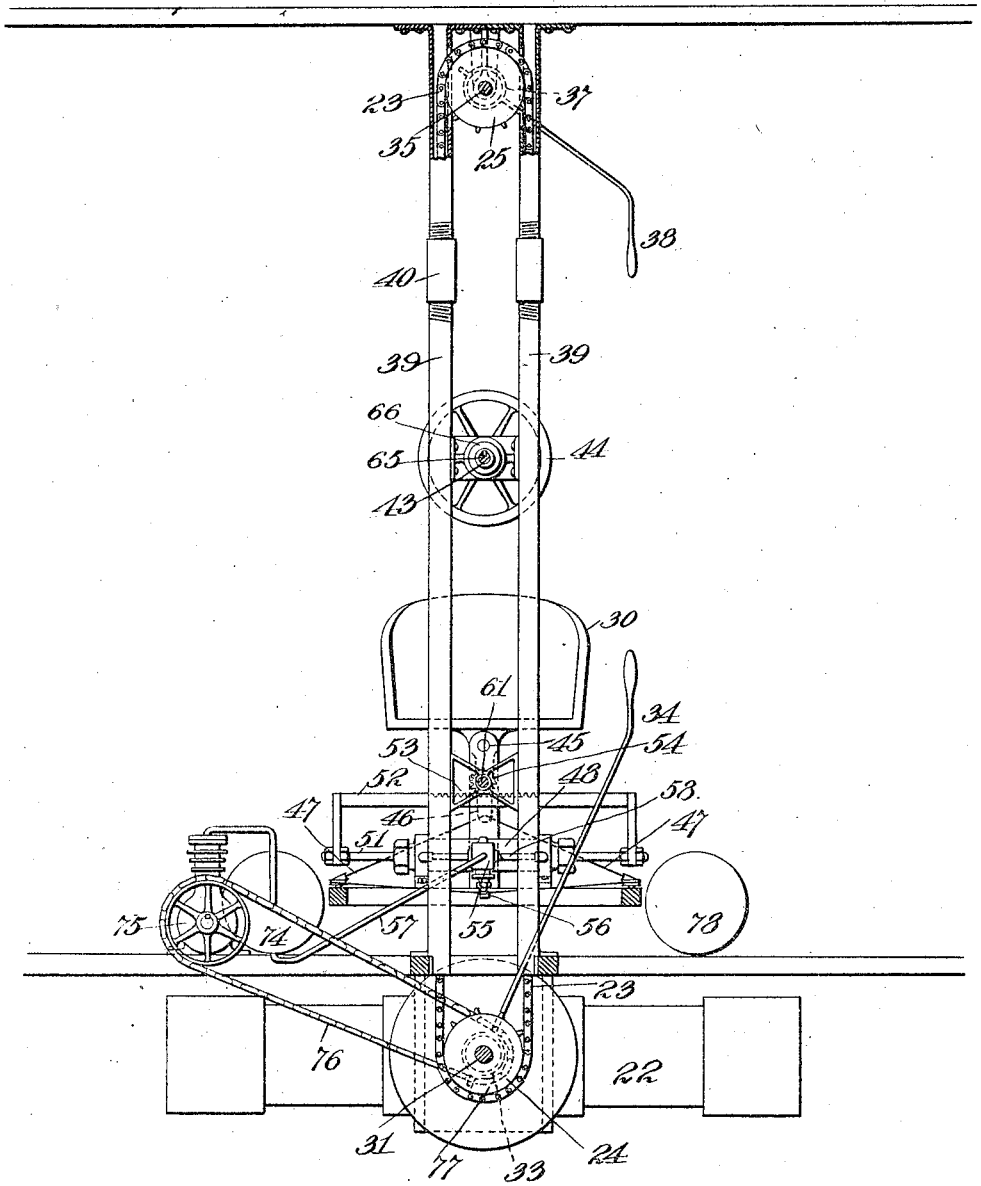

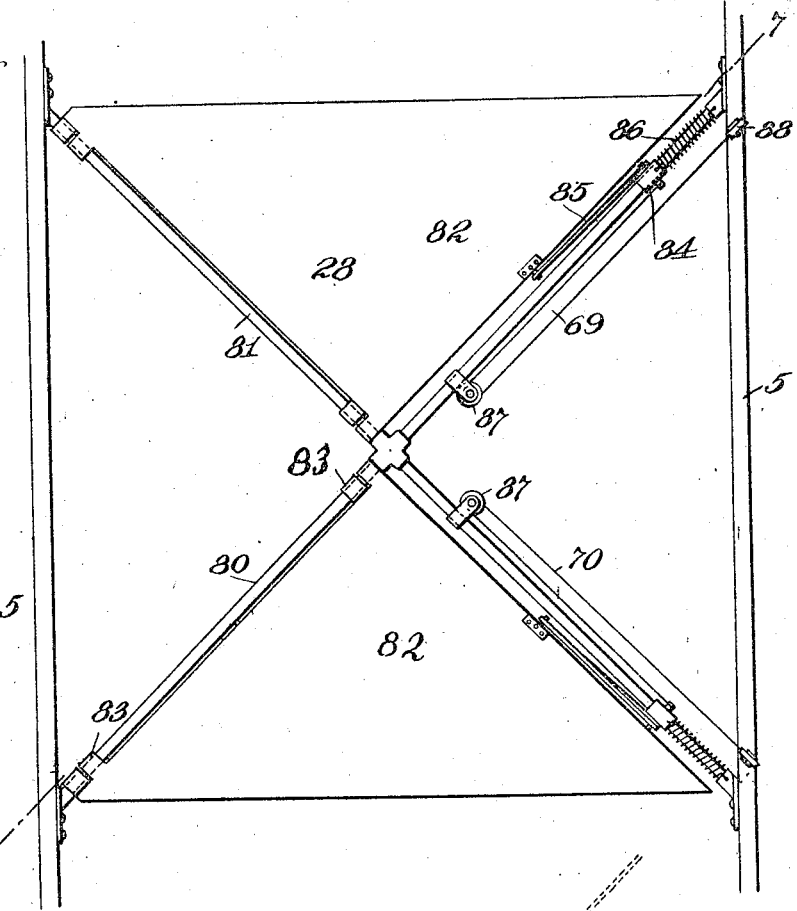
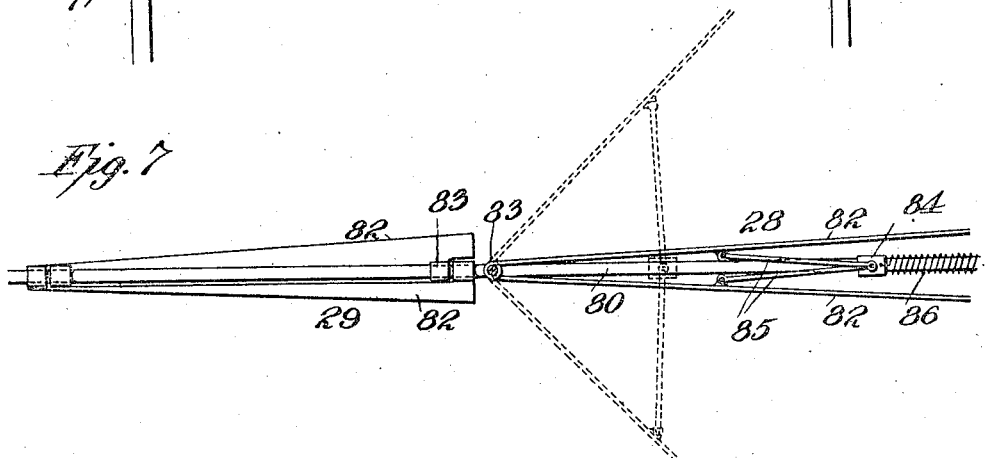

1,214,835.

Patented Feb. 6, 1917.
6 SHEETS—SHEET 5.

Witnesses:
Gustav Schellack
John L. Lotsch

Inventor
John Thomas Simpson
By Dyer, Dyer & Taylor
Attorneys.

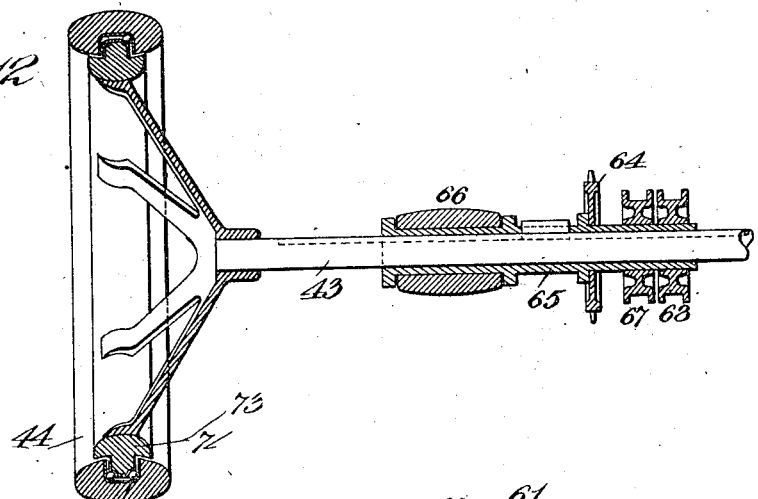
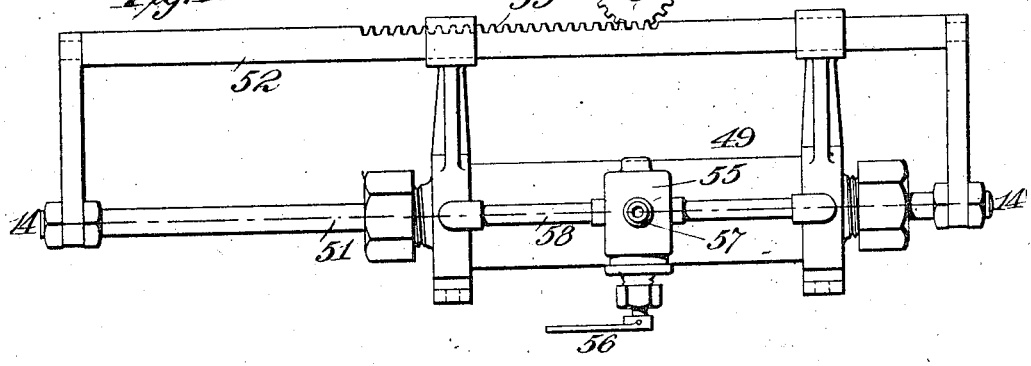
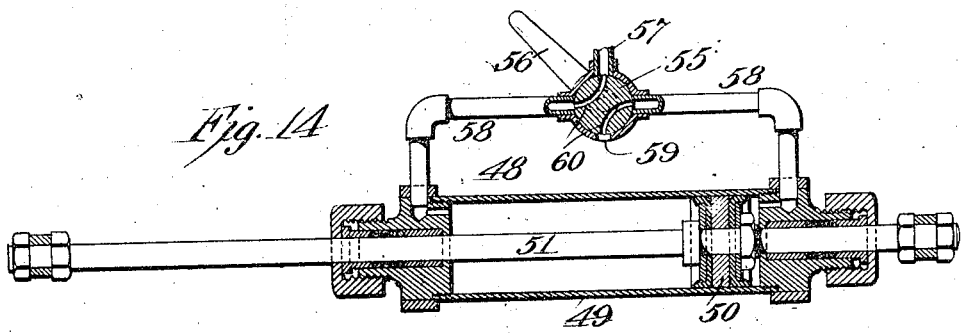

UNITED STATES PATENT OFFICE.

JOHN THOMAS SIMPSON, OF NEWARK, NEW JERSEY.

FLYING-MACHINE.

1,214,835. Specification of Letters Patent. Patented Feb. 6, 1917.

Application filed July 12, 1910. Serial No. 571,557.

*To all whom it may concern:*

Be it known that I, JOHN T. SIMPSON, a citizen of the United States, and residing in Newark, in the county of Essex and State of New Jersey, have invented a certain new and useful Flying-Machine, of which the following is a specification.

The object I have in view is the production of an aeroplane or heavier-than-air flying machine, which will have advantages in stabilizing, balancing, starting and alighting. Further objects are to produce means by which the motor may be started while the machine is on the ground and to produce means for continuing flight, in the event of a portion of the propelling mechanism ceasing to operate, to stabilize without the use of the steering rudder, and also to stabilize by powerful and certain mechanism independent of the strength of the operator. These and further objects will appear from the following specification and accompanying drawings considered together or separately.

In the drawings, Figure 1 is the front elevation of an apparatus embodying my invention.

Fig. 2 is a side elevation of the same showing it in the position it assumes when in flight.
Fig. 3 is a detail plan view of one wing tip, showing one of the ailerons in place.

Fig. 4 is a side elevation on an enlarged scale of the centrally located operating and controlling mechanism.
Fig. 5 is a section on the line 5—5, of Fig. 4.

Fig. 6 is an elevation, on the same scale as the preceding two figures, of a pair of ailerons.
Fig. 7 is a sectional view on the line 7—7 of Fig. 6 showing one aileron in open position in broken lines.

Fig. 12 is a detail sectional view on a large scale of a portion of the controlling gear.

Fig. 13 is a side elevation of the mechanical stabilizing motor.

Fig. 14 is a sectional view thereof on the line 14—14 of Fig. 13.

In all of the views like parts are designated by the same reference characters.

Figure 8:
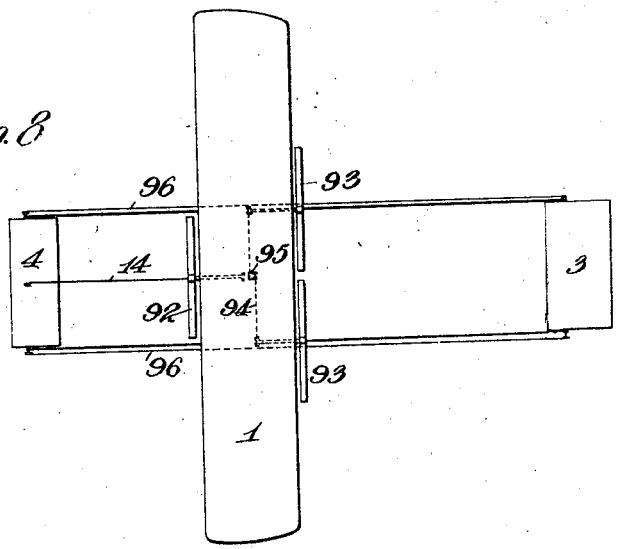
Fig. 8 is a plan view on a reduced scale of an aeroplane showing a modified form of a propelling and balancing arrangement.

Certain of my improvements may be used upon an aeroplane of the bi-plane type, and the embodiment chosen for illustration is of this character. I desire to have it understood that the number of planes of the machine is unimportant and that the invention can be carried out with any form of aeroplane.

In the drawings, 1 is the top plane, 2 is the bottom plane, such planes being superposed in the usual manner. 3 is the rear plane for controlling altitude and 4 is the front plane for the same purpose. 5 is the frame. This frame is made of verticals and longitudinals as shown, with diagonal filamentous tension members to secure rigidity. This frame is lightly and rigidly formed. The frame is supported upon front wheels 6—6 and rear wheels 7—7, there being four sets of such wheels illustrated. The front wheels are arranged in pairs for the purpose to be described. The front wheels are supported upon a sled like arrangement 8 forming skids, there being two of such arrangements in the front. On the wing tips at the front are skids 9. These skids are for contact with the ground when alighting and are on a higher plane than the sleds 8, consequently when these end skids are brought into action when striking the earth, it is apparent that the apparatus must be inclined. For this reason the outside wheels of each pair of front wheels are turned outward so that when they strike they will strike perpendicular to their axis. These wheels are mounted upon a frame 10 pivoted to the sled and secured by an elastic member 11, which may be of rubber to permit the frame to pivot when the wheels strike the ground, and allow the load to be taken up by the sled. The rear wheels, which are not in pairs, but are two in number, as shown, are mounted on similar frames and connected by the same form of elastic member to skids 12. The rear wheels are on a higher plane than the front wheels, as it is necessary in starting to incline the planes upward to the proper angle. The rear plane 3 is adjustable for different angles of incidence to be determined by trial flight. Adjusting means are shown at 13. This adjusting means for holding the plane at the proper angle of incidence comprises a pillar with a number of openings as illustrated, for the attachment of a pin on the forward edge of the plane, the plane being secured to a horizontal pivot at a point intermediate its ends. The forward plane 4 is mounted upon a pivot as shown and is controlled by a wire 14, which passes over suitable guide pulleys as shown and connects to the top and the bottom of the plane, the central portion of the wire being connected to a section of chain which passes around a sprocket 15 (see Fig. 4). The rudders 16, which are two in number, one above each of the rear wheels 7—7, are mounted upon vertical axes and are controlled by wires 17 which pass around suitable guide pulleys to the pedals 18 (see Fig. 4).

In the preferred embodiment of my invention I employ a front propeller 19 and a rear propeller 20, said propellers being mounted upon suitable shafts in alinement. I also prefer to utilize a forward engine 21 and a rearward engine 22, having shafts in alinement. The engines illustrated are of the horizontal, two cylinder, double opposed internal combustion type. The kind of engine may be varied if desired. The shafts of the engines are connected to the shafts of the propeller through suitable sprockets and a chain 23, the sprocket on the line with the engines being indicated by the character 24, and the sprocket on the line with the propellers being indicated by the character 25. The engines, as shown, are below the bottom of the frame so as to make the center of gravity as low as possible and also to allow the operator to be above the engine for safety, while the propellers are arranged adjacent to the top of the frame.

The ailerons 26, 27, 28 and 29 are mounted adjacent to the wing tips and are connected to suitable stabilizing mechanism which will be described. The operator's seat 30 is mounted on the frame within convenient distance of the pedals and the engine.

I prefer to employ a plurality of motors or engines so that in the event of one of them becoming inoperative, the machine can still remain in flight by utilizing a certain mechanism which I will describe. I also prefer to employ a plurality of propellers for the same purpose, namely, so that if one engine is disconnected one of the propellers may also be disconnected. These propellers I prefer to arrange in alinement one behind the other, so that if one is disconnected the apparatus may be propelled by the other, which is not possible if two propellers were used upon different vertical planes. The mechanism for connecting the engines to the propellers is best shown in Figs. 4 and 5. The sprocket 24 in alinement with the engine is mounted upon a short shaft 31 in suitable bearings carried by the frame. On each extremity of this shaft is a clutch, the forward clutch being indicated by the character 32 and the rearward clutch by the character 33. It is apparent that by actuating both of these clutches both engines will be connected to the sprocket 24 and that if both are disengaged the sprocket will not be rotated, and the sprocket may be rotated by either one or the other of the engines, which depends upon which clutch is actuated. These clutches are controlled by levers 34—34 within convenient reach of the operator while seated.

The sprocket 25, which is in alinement with the shafts of the propellers, is mounted also upon a short shaft 35, the ends of which are provided with a forward clutch 36 and a rear clutch 37, these clutches connecting with the respective forward and rearward propeller shafts. These clutches are controlled by suitable levers 38, also within convenient reach of the operator. It is apparent that both propellers may be rotated by the sprocket 25 when both clutches are engaged and that neither will be rotated if both clutches are disengaged, and one or the other would be rotated, as depends upon whether the forward or rearward clutch is actuated. By this improved apparatus it is apparent that the engine may be started when the apparatus is on the ground and with both of the lower clutches 32 and 33 disengaged the propellers will remain at rest. After the engine is started and is in rotation, one or both of the propellers may be brought into action and rotated by one or both of the engines by actuating the suitable clutches. It is also apparent that if one or the other engine goes wrong or breaks down, or becomes disabled, that the other engine and propeller can be coupled together, the combinations of arrangements permitting either or both propellers to be operated by either or both engines. As the rear propeller 20 must operate in the air forced backward by the forward propeller 19, it is apparent that the pitch of this propeller should be greater than the pitch of the forward propeller, as depends upon the size and speed of the propeller.

The propeller shafts and upper short shaft 35 are mounted in suitable bearings and the bearings on the upper short shaft and the bearings of the lower short shaft are connected together by a pair of radius tubes 39—39, such tubes being provided with adjusting sleeves 40 to secure proper adjustment for the chain. These tubes have openings at the tops and bottoms for the entrance and exit of the chain and therefore provide a protection for the chain and also a protection to the operator. These radius tubes also support portions of the operating mechanism as will be described.

The front plane 4, as has been stated, is controlled by the sprocket 15. This sprocket is mounted in suitable bearings on a shaft which carries a pinion 41. This pinion engages with a rack 42, mounted upon a shaft 43, said shaft being mounted in bearings so that it can be moved longitudinally to rotate the pinion 41 by engagement with the rack, and thereby control the vertical steering of the apparatus. The rear end of the shaft 43 is provided with a hand wheel 44, by means of which the shaft may be moved longitudinally within its bearings. The shaft 43 also controls a portion of the stabilizing device as will be described.

The stabilizing device includes means for operating the ailerons 26, 27, 28 and 29 and consists of mechanism of a semi-automatic nature, and also standby mechanism to be manually operated. The semi-automatic mechanism includes a device controlled by the position of the operator's seat, and includes an engine operated by compressed air, which is furnished by the propelling mechanism. The standby mechanism is controlled by the wheel 44. The details of the semi-automatic mechanism are as follows: The seat is so mounted upon its support that it will be swung from side to side by the involuntary or instinctive movements of the operator, resulting from inclinations of the machine. The support for the seat is by means of a shaft 45, the seat having a depending arm 46. Suitable stops 97 on the standard 98 are provided to limit the extent of movement of the seat. To this arm are connected wires 47, which in turn are connected to the controller of the air engine 48 (see Figs. 13 and 14). This air engine is composed of a cylinder 49 with stuffing boxes at the ends, as shown, a piston 50 traversing the cylinder and a piston rod 51 connected to the piston and passing through the stuffing boxes. The ends of this rod are connected to a frame 52 which slides in bearings on the cylinder, as shown, and is provided with a rack 53 which engages with a pinion 54. The controlling mechanism for the air engine comprises a valve 55, controlled by an arm 56. To this arm the wires 47 connect and serve to move it from right to left or vice versa. This valve is of the four port type, the air entering through the pipe 57 and passing through the side pipes 58—58 to one or the other side of the piston 50, as depends upon the position of the valve. The exhaust or outlet 59 is opposite the inlet pipe 57. The ports 60 in the valve are shown as narrower than the pipes 58—58, for the purpose of allowing a certain amount of lost motion; in other words, when the arm 56 is in the vertical position, in the embodiment illustrated, the ports will be closed and will not be opened until the arm has partaken of considerable movement one way or the other. When they are opened they will be suddenly opened, consequently the engine will not operate until the seat has been tilted to some extent. When it does operate it will be operated with full power, caused by a very slight further movement of the seat. By this structure sudden fluctuations of the engine will not be caused by trivial movements of the seat.

Turning now to Figs. 4 and 5, it is seen that the pinion 54 is mounted upon a shaft 61 mounted in suitable bearings, the forward end of the shaft carrying a sprocket 62 having a length of chain intermeshed with its teeth which, through the wires 63, and a short length of chain will connect with a sprocket 64 mounted upon the shaft 43. This sprocket is carried upon a sleeve 65 (see Fig. 12) such sleeve being connected to the shaft 43 by a feather or other device to cause the two to rotate together and at the same time to permit the shaft to be moved longitudinally. This sleeve is mounted in a bearing 66 so that its longitudinal position is fixed. The sleeve 65 carries drums 67 and 68 over which are wound wires 69 and 70 respectively, these wires connect to the ailerons 26, 27, 28 and 29 in a manner which will be described, so that when the shaft is rotated in one direction, the upper aileron on one wing tip and the lower aileron on the opposite wing tip will be opened and when rotated in the opposite direction the other two ailerons will be similarly affected.

From this description it will be apparent that as the seat is oscillated upon its bearings by the involuntary movement of the operator, the air engine 48 will be similarly actuated and through the wires 63 the shaft 43 will be turned. This will produce a semi-automatic stabilizing of the apparatus. The stand-by control will be in the wheel 44. In order to avoid the drag of the air engine when the stand-by apparatus is in action, I provide a clutch 71 on the shaft 61 to disconnect the sprocket 62.

Fig. 12 illustrates an arrangement in which the operator can keep his hands upon the wheel 44 to secure the proper longitudinal movement of the shaft 43 and at the same time be within instant grasp of the standby stabilizer. This is accomplished by mounting the rim of the wheel 44 in bearings 72 on an inner, supplemental rim 73, such supplemental rim being connected to the shaft 43. In ordinary use, when the semi-automatic mechanism is in operation, the operator will rest his hands on the periphery of the wheel 44. When, however, the standby mechanism is in operation he will close his fingers around the inside of the supplemental rim 73 and thereby rotate the shaft 43.

The air supply is contained within a tank 74, pressure being supplied by the compressor 75, which is actuated by a chain 76, from a sprocket 77. This compressor may be provided with disconnecting mechanism not shown, and the tank 74 may be provided with a relief valve not shown. The tank 74 is balanced by a tank 78 which may contain lubricating oil. The gasolene or other fuel is carried in the tanks 79, which are arranged higher than the engines for proper feed to the carbureters.

Figure 10:
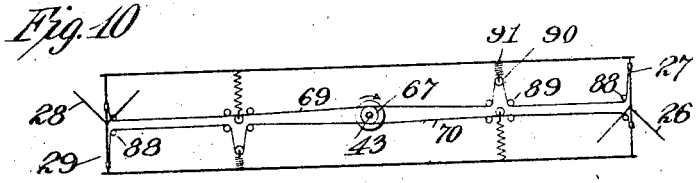
Fig. 10 is a diagrammatic view of the preferred form of connections to the stabilizing ailerons showing the latter in one position.
Figure 11:
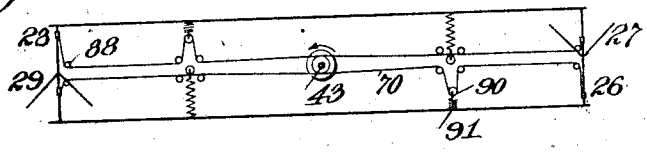
Fig. 11 is a similar position showing the ailerons in different position.

The ailerons 26, 27, 28 and 29, are mounted as before stated, adjacent to the wing tips of the main planes 1 and 2. These ailerons are made as follows: Diagonal tubular struts 80 and 81 are provided, such struts crossing at the center and forming an X frame, their ends being connected to the frame 5—5. To the forward sections of these struts are pivoted the ailerons, each aileron is made of two plates 82, which may be made of any material sufficiently light and rigid for the purpose, and are provided with bearings or hinges 83, on the forward parts of the struts 80 and 81. These plates are adapted to be turned upon their hinges so they may lie in a generally fore and aft position as shown in solid lines (see Fig. 7) or they may be turned upon their hinges and opened, as shown in dotted lines in Fig. 7, the apparatus being analogous to the opening or closing of an umbrella. The opening and closing mechanism is identical for all of the ailerons. It comprises a sleeve 84 mounted to slide upon the rear halves of the struts 80 or 81 respectively, said sleeve being connected by toggles 85 to the plates. It is apparent that by moving the sleeve along the strut in one direction or the other, the aileron will be opened or closed. The pressure of the air will tend to close the aileron, but this pressure may be augmented by a spring 86. The sleeve is moved to open the aileron against the pressure of the air by suitable wires 69 and 70, such wires being connected to their respective sleeves. Each wire passes over a pulley 87 (see Fig. 6) so as to get the proper lead, and also over a pulley 88 on the frame 5, so as to lead to the drums 67 and 68. The arrangement of the wires is best illustrated in Figs. 10 and 11. It will be apparent that the upper lefthand aileron 28 is connected to the wire 69 and that the lower lefthand aileron 29 is connected to the same wire, and that the upper righthand aileron 27 is connected to the wire 70, and the lower corresponding right hand aileron 26 is connected to the same wire. At an intermediate point between the pulleys 88 and the drums 67 and 68 are mounted pairs of guide pulleys 89, such pulleys being relatively close together. Between each two pulleys of a pair is mounted a pulley or tackle block 90 through which the wire is threaded, and the tackle block 90 is connected to the frame 5 by a spring 91. These springs need not be very powerful as they are simply for the purpose of taking up the slack in the wire. It is apparent therefore that when the shaft 43 is rotated in one direction or the other by the mechanism already described, the upper aileron on one side and the lower aileron on the other will be opened, while the two other ailerons will remain closed. It is also apparent that when the shaft 43 is in neutral position that all four ailerons will be closed. As an example of this operation, the working of the two ailerons 28 and 29 may be followed. The shaft 43 being rotated in the direction of the arrow shown in Fig. 10 the upper portion of the wire 69 will be tightened, opening the aileron 28. The aileron 29 being already closed the slack wire moved in that direction will be taken up by the pulley 90 and spring 91. At the same time that the aileron 28 is opening the aileron 26 will also be opening by the wire 70 acting in the same manner. When the shaft 43 is reversed the action shown in Fig. 11 will be followed, namely, the ailerons 27 and 29 will be opened, while the ailerons 26 and 28 remain closed. If desired each aileron may have but one plate, instead of two. The wires may be so proportioned as to length and position on their drums, that the aileron on one side may begin to open slightly in advance of that on the other, and remain in a slightly more open position, so that stabilizing may take place without sidewise deflection and consequent employment of the rudders 16—16.

Figure 9:
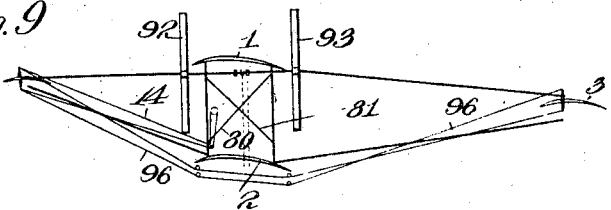
Fig. 9 is a side elevation for the same.

Figs. 8 and 9 illustrate a modification of my invention in which three propellers are employed and in which both rear and front planes are controlled together. The forward propeller 92 is mounted as described in the preceding embodiment of my invention, but in lieu of a single rear propeller two propellers 93 are employed. These propellers are connected by chains 94 to the sprockets 95, these sprockets being connected to the short shaft already described by the clutch there shown. By this arrangement it is apparent that instead of the single rear propeller being rotated there will be two rear propellers both rotated at the same speed and in the same direction, or by means of crossed chains in opposite direction. These propellers may be used as the regular propelling mechanism, the propeller 92 being employed as a standby and being allowed to remain idle while the machine is being propelled by propellers 93—93. Should either of the propellers 93—93 become broken or rendered inoperative, they may both be disconnected and the propeller 92 be connected in lieu thereof. It is apparent that one or both engines may be used for driving the two sets of propellers. If the situation demands it, all these propellers may be operated at the same time.

The vertical steering mechanism illustrated in Fig. 9 differs from that already described in that the rear plane 3 freely moves and is controlled by wires 96, which pass around suitable guide pulleys and are connected to the forward or front plane 4, the wires being crossed as shown so that the rear plane will tip up as the forward plane dips down.

In accordance with the provisions of the patent statutes I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A flying machine having stabilizing planes, semi-automatic mechanism operating the same, stand-by mechanism interconnected with said semi-automatic mechanism, said stand-by mechanism including a wheel, and a rim loosely mounted to turn upon the wheel.

2. A flying machine having an air engine, devices for controlling the engine, a shaft turned by the engine, a second shaft, connections to the two shafts, drums on the second shaft, stabilizing planes, connections between the drum and the stabilizing planes, the connections to the second shaft and drums permitting longitudinal movement of the said shaft, connections controlled by the longitudinal movement of the second shaft for effecting the dip of the machine, and a manual controlling device for effecting longitudinal movement of the second shaft.

3. A flying machine having a longitudinally movable shaft, a wheel on the shaft, said wheel having a rotatable rim, connections between the wheel and rim to permit the rim to rotate independently of the wheel, automatic mechanism for turning the shaft, a disconnecting mechanism for the automatic mechanism, and mechanism for controlling the dip of the flying machine actuated by the longitudinal movement of the shaft.

4. An aileron having a pair of plates, each the shape of a right angle triangle, and each hinged along a side adjacent the right angle to a common axis.

5. A flying machine having a frame with X-members, a plate pivoted to turn about one member as an axis, a sleeve sliding on the other member and connections between the sleeve and plate.

6. A flying machine having an aileron for ascent and an aileron for descent adjacent to each wing tip, each aileron being formed of two plates mounted to turn on an inclined axis, the axes of each pair of ailerons being at an angle to each other, wires connecting the ailerons, and means for moving an upper aileron on one tip and a lower aileron on the opposite wing tip simultaneously.

7. A flying machine having a pair of folding ailerons adjacent to each extremity, and one above the other such ailerons normally remaining closed, means for simultaneously opening the upper aileron of one pair, and the lower aileron of the opposite pair, said means operating to allow all the ailerons to remain closed or to open not more than one of each pair at one time.

8. A flying machine having a frame of X-members, a plate pivoted to turn about each member as an axis, a sleeve sliding on each member, and connections between the sleeve on one member with the plate on the other member.

9. A flying machine having a frame of X-members, a plurality of plates pivoted to turn about each member as an axis, a sleeve sliding on each member, and connections between the sleeve on one member and the plates on the other member.

10. A flying machine having a frame of X-members, a plate pivoted to turn about each member as an axis, a sleeve sliding on each member, connections between the sleeve on one member with the plate on the other member, and means for manually moving the sleeve in one direction and means for automatically moving the sleeve in the opposite direction.

11. A flying machine having a frame of X-members, a plurality of plates pivoted to turn about each member as an axis, a sleeve sliding on each member, connections between the sleeve on one member and the plate on the other member, and means for manually moving the sleeve in one direction and means for automatically moving the sleeve in the opposite direction.

12. A flying machine having a frame of X-members, a plurality of plates pivoted to turn about each member as an axis, a sleeve sliding on each member, connections between the sleeve on one member and the plate on the other member, means for manually moving the sleeve in one direction, and a spring for automatically moving the sleeve in the opposite direction.

13. A flying machine having a sustaining plane, a frame of X-members adjacent to each extremity of said plane, a plurality of plates pivoted to turn about a member of each frame as an axis, said plates normally lying parallel to the direction of movement of the machine, a sleeve carried on the other member of each frame, and means for moving the sleeve to simultaneously move the plates on each side of the sustaining plane to positions at an angle to the direction of movement of the machine.

This specification signed and witnessed this 9th day of July, 1910.

JOHN THOMAS SIMPSON.

Witnesses:
LEONARD H. DYER,
JOHN L. LOTSCH.